United States Patent
Peleg et al.

(10) Patent No.: US 10,210,620 B2
(45) Date of Patent: *Feb. 19, 2019

(54) METHOD AND SYSTEM FOR GENERATING ADAPTIVE FAST FORWARD OF EGOCENTRIC VIDEOS

(71) Applicant: Yissum Research Development Company of The Hebrew University of Jerusalem Ltd., Jerusalem (IL)

(72) Inventors: Shmuel Peleg, Mevaseret Zion (IL); Yair Poleg, Nes-Harim (IL); Tavi Halperin, Tel-Aviv (IL); Chetan Arora, New Delhi (IN)

(73) Assignee: Yissum Research Development Company of the Hebrew University of Jerusalem Ltd., Jerusalem (IL)

(*) Notice: Subject to any disclaimer, the term of this patent is extended or adjusted under 35 U.S.C. 154(b) by 33 days.

This patent is subject to a terminal disclaimer.

(21) Appl. No.: 15/613,350

(22) Filed: Jun. 5, 2017

(65) Prior Publication Data
US 2017/0270677 A1 Sep. 21, 2017

Related U.S. Application Data

(63) Continuation of application No. 14/962,776, filed on Dec. 8, 2015, now Pat. No. 9,672,626.
(Continued)

(51) Int. Cl.
*G06T 7/285* (2017.01)
*G06T 7/20* (2017.01)
(Continued)

(52) U.S. Cl.
CPC ............ *G06T 7/285* (2017.01); *G06T 3/0087* (2013.01); *G06T 7/20* (2013.01); *G11B 27/00* (2013.01);
(Continued)

(58) Field of Classification Search
None
See application file for complete search history.

(56) References Cited

U.S. PATENT DOCUMENTS

| | | | |
|---|---|---|---|
| 8,498,493 B1* | 7/2013 | Choudhary | H04N 19/52 375/240.16 |
| 2008/0002771 A1* | 1/2008 | Chen | H04N 19/139 375/240.16 |

(Continued)

OTHER PUBLICATIONS

Lin, Chung-Ching, Sharath Pankanti, and John Smith. "Accurate coverage summarization of UAV videos." In Applied Imagery Pattern Recognition Workshop (AIPR), 2014 IEEE, pp. 1-5. IEEE, 2014. (Year: 2014).*

(Continued)

*Primary Examiner* — Michelle M Entezari
(74) *Attorney, Agent, or Firm* — Pearl Cohen Zedek Latzer Baratz LLP (57) ABSTRACT

A method and a system for generating adaptive fast forward of egocentric videos are provided here. The method may include the following steps: obtaining a video footage containing a sequence of image frames captured by a non-stationary capturing device; estimating a moving direction of the non-stationary capturing device for a plurality of frames in the sequence of image frames; and generating a shortened video footage having fewer frames than said video footage, by sampling the sequence of image frames, wherein the sampling is carried out by selecting specific image frames and that minimize an overall cost associated with a deviation from a specific direction related to the moving direction, calculated for each of said plurality of image frames.

19 Claims, 9 Drawing Sheets

Related U.S. Application Data (60) Provisional application No. 62/088,719, filed on Dec. 8, 2014, provisional application No. 62/236,557, filed on Oct. 2, 2015.

(51) Int. Cl.
*G06T 3/00* (2006.01)
*G11B 27/00* (2006.01)

(52) U.S. Cl.
CPC ............... *G06T 2207/10016* (2013.01); *G06T 2207/30241* (2013.01)

(56) References Cited

U.S. PATENT DOCUMENTS

2010/0027663 A1* 2/2010 Dai ...................... H04N 19/159
375/240.16
2010/0183243 A1* 7/2010 Brand ................... G06T 3/0093
382/282

OTHER PUBLICATIONS

Wang, S., Yang, J., Zhao, Y., Cai, A. and Li, S.Z., Nov. 2011. A surveillance video analysis and storage scheme for scalable synopsis browsing. In 2011 IEEE International Conference on Computer Vision Workshops (ICCV Workshops) (pp. 1947-1954). IEEE. (Year: 2011).*

Shahraray B. Scene change detection and content-based sampling of video sequences. InDigital Video Compression: Algorithms and Technologies 1995 Apr. 17, 1995 (vol. 2419, pp. 2-14). International Society for Optics and Photonics. (Year: 1995).*

Liu Y, Lu Y, Shi Q, Ding J. Optical flow based urban road vehicle tracking. InComputational Intelligence and Security (CIS), 2013 9th International Conference on Dec. 14, 2013 (pp. 391-395). IEEE. (Year: 2013).*

* cited by examiner

METHOD AND SYSTEM FOR GENERATING ADAPTIVE FAST FORWARD OF EGOCENTRIC VIDEOS

CROSS-REFERENCE TO RELATED APPLICATIONS

This application is a Continuation of U.S. patent application Ser. No. 14/962,776, filed on Dec. 8, 2015, now U.S. Pat. No. 9,672,626, issued on Jun. 6, 2017, which claims the benefit of U.S. Provisional Patent Application No. 62/088,719, filed on Dec. 8, 2014, and U.S. Provisional Patent Application No. 62/236,557, filed on Oct. 2, 2015, all of which are incorporated herein by reference in their entireties.

FIELD OF THE INVENTION

The present invention relates generally to the field of image processing, and more particularly to video editing.

BACKGROUND OF THE INVENTION

The use of body worn wearable cameras (referred herein as egocentric cameras) is on the rise. These cameras are typically operated in a hands-free, always-on manner, allowing the wearers to concentrate on their activities. While more and more egocentric videos are being recorded, watching such videos from start to end is difficult due to two aspects: (i) the videos tend to be long and boring; and (ii) camera shake induced by natural head motion further disturbs viewing. These aspects call for automated tools to enable faster access to the information in such videos.

Fast forward is a natural choice for faster browsing of egocentric videos. The speed factor depends on the cognitive load a user is interested in taking. Naïve fast forward uses uniform sampling of frames, and the sampling density depends on the desired speed up factor. Adaptive fast forward approaches known in the art try to adjust the speed in different segments of the input video so as to equalize the cognitive load. For example, sparser frame sampling giving higher speed up is possible in stationary scenes, and denser frame sampling giving lower speed ups is possible in dynamic scenes. In general, content aware techniques adjust the frame sampling rate based upon the importance of the content in the video. Typical importance measures include scene motion, scene complexity, and saliency. None of the aforementioned methods, however, can handle the challenges of egocentric videos.

SUMMARY OF THE INVENTION

Some embodiments of the present invention provide a method and a system for adaptive frame sampling that give more stable fast forwarded videos. Adaptive frame sampling is formulated as energy minimization, whose optimal solution can be found in polynomial time.

In a variant embodiment of the present invention, each frame in the generated fast forward video is actually a mosaic image composed from several input images. In this embodiment, the natural shaking of the camera is taken as a feature, rather than a bug, to increase the field of view of each frame.

A generalized method in accordance with some embodiments of the present invention may include the following steps: obtaining a video footage containing a sequence of image frames captured by a non-stationary capturing device; estimating a moving direction of the non-stationary capturing device for a plurality of frames in the sequence of image frames; and generating a shortened video footage having fewer frames than said video footage, by sampling the sequence of image frames, wherein the sampling is carried out by selecting specific image frames and that minimize an overall cost associated with a deviation from a specific direction related to the moving direction, calculated for each of said plurality of image frames.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that, throughout the specification, discussions utilizing terms such as "processing," "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Most egocentric videos suffer from substantial camera shake due to natural head and body motion of the wearer.

Some embodiments of the present invention provide a model frame sampling as an energy minimization problem. A video is represented as a directed a-cyclic graph whose nodes correspond to input video frames. The weight of an edge between nodes, e.g., between frame t and frame t+k, represents a cost for the transition from t to t+k. For fast forward, the cost represents how "stable" the output video will be if frame t is followed by frame t+k in the output video. This can also be viewed as introducing a bias favoring a smoother camera path. The weight will additionally indicate how suitable k is to the desired playback speed. In this formulation, the problem of generating a stable fast forwarded video becomes equivalent to that of finding a shortest path in a graph. We keep all edge weights non-negative and note that there are numerous, polynomial time, optimal inference algorithms available for finding a shortest path in such graphs. It has been shown herein that sequences produced with the method in accordance with some embodiments of the present invention are more stable and easier to watch compared to traditional fast forward methods.

Video Summarization

Video Summarization methods sample the input video for salient events to create a concise output that captures the essence of the input video. This field has seen many new papers in the recent years, but only a handful address the specific challenges of summarizing egocentric videos. In some known methods, important keyframes are sampled from the input video to create a story-board summarizing the input video. In known methods, subshots that are related to the same "story" are sampled to produce a "story-driven" summary. Such video summarization can be seen as an extreme adaptive fast forward, where some parts are completely removed while other parts are played at original speed. These techniques are required to have some strategy for determining the importance or relevance of each video segment, as segments removed from summary are not available for browsing. As long as automatic methods are not endowed with human intelligence, fast forward gives a person the ability to survey all parts of the video.

Video Stabilization

There are two main approaches for video stabilization. One approach uses 3D analysis and reconstruction methods to reconstruct a smooth camera path. Another approach avoids 3D, and uses only 2D motion models followed by non-rigid warps A naïve fast forward approach would be to apply video stabilization algorithms before or after uniform frame sampling. As noted before also, stabilizing egocentric video doesn't produce satisfying results. This can be attributed to the fact that uniform sampling, irrespective of whether done before or after the stabilization, is not able to remove outlier frames, e.g., the frames when camera wearer looks at his shoe for a second while walking in general. In addition, stabilization of a very shaky video substantially reduces the field of view.

An alternative approach termed "coarse-to-fine stabilization" stabilizes the input video and then prunes frames from the stabilized video a bit. This process is repeated until the desired playback speed is achieved. Being a uniform sampling approach, this method does not avoid outlier frames. In addition, it introduces significant distortion to the output as a result of repeated application of a stabilization algorithm.

Some embodiments of the present invention differ from traditional fast forward as well as traditional video stabilization. It is attempted in accordance with some embodiments of the present invention to adjust frame sampling in order to produce a stable-as-possible fast forward sequence. Rather than stabilizing outlier frames, it has been preferred to skip them. While traditional stabilization algorithms must make compromises (in terms of camera motion and crop window) in order to deal with every outlier frame, some embodiments of the present invention have the benefit of choosing which frames to include in the output. Following our frame sampling, traditional video stabilization algorithms can be applied to the output of some embodiments of the present invention to further stabilize the results.

A recent work dedicated to egocentric videos ("Hyperlapse") proposed to use a combination of 3D scene reconstruction and image based rendering techniques to produce a completely new video sequence, in which the camera path is perfectly smooth and broadly follows the original path. However, the scene reconstruction and image based rendering methods are not guaranteed to work for many egocentric videos, and the computation costs involved are very high. The technique referred to as Hyperlapse by the authors, may therefore be less practical for day-long videos which need to be processed at home. Unlike Hyperlapse, some embodiments of the present invention can use only raw frames sampled from the original video.

Proposed Frame Sampling

Most egocentric cameras are usually worn on the head or attached to eyeglasses. While this gives an ideal first person view, it also leads to significant shaking of the camera due to the wearer's head motion. Camera Shaking is higher when the person is "in transit" (e.g., walking, cycling, driving, etc.). In spite of the shaky original video, it would be preferred for consecutive output frames in the fast forward video to have similar viewing directions, almost as if they were captured by a camera moving on rails. Some embodiments of the present invention provide a frame sampling technique, which selectively picks frames with similar viewing directions, resulting in a stabilized fast forward egocentric video.

Figure 1:
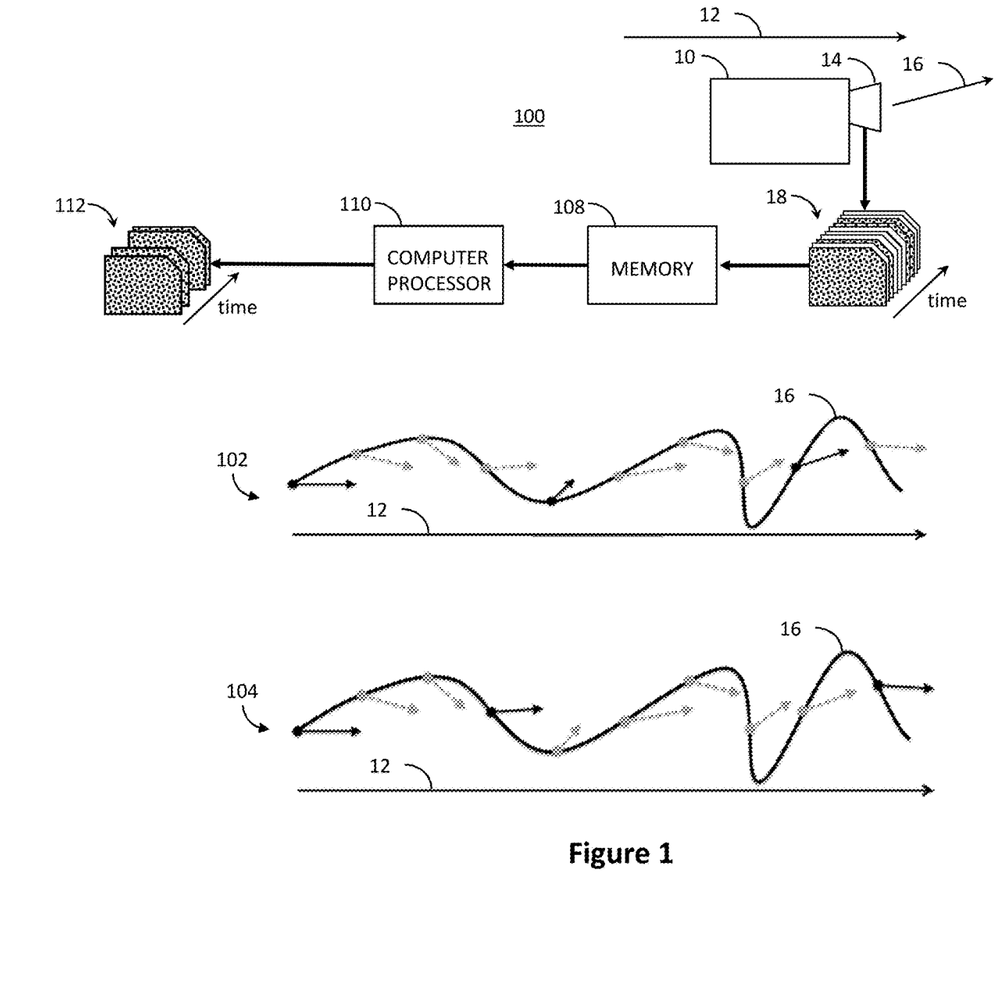
FIG. 1 illustrates a block diagram and two path diagrams of a system in accordance with some embodiments of the present invention.

FIG. 1 illustrates a system 100 in accordance with some embodiments of the present invention. System 100 may include a memory 108 configured to store a video footage 18 containing a sequence of image frames captured by a non-stationary capturing device 14. System 100 may include a computer processor 110 configured to: estimate a moving direction 16 of the non-stationary capturing device 14

(mounted on a moving platform 10) for a plurality of frames 18 in the sequence of image frames; and generate a shortened video footage having fewer frames 112 than said video footage, by sampling the sequence of image frames, wherein the sampling is carried out by selecting specific image frames that minimize an overall cost associated with a deviation from a specific direction related to the moving direction 12, calculated for each of said plurality of image frames.

Graph diagrams 102 and 104 illustrate a view from above on the camera path (the line) and the viewing directions of the frames (the arrows) as the camera wearer walks forward during a couple of seconds. The sampling in graph 102 is uniform 5× frames sampling in accordance with the prior art, shown with solid arrows gives output with significant changes in viewing directions. Conversely, graph diagram 104 which depicts some embodiments of the present invention illustrates sampling represented as solid arrows, which prefers forward looking frames at the cost of somewhat non uniform sampling.

Head Motion Prior

When "in transit" (e.g., walking/cycling/driving and the like), the head might be moving instantaneously in all directions (left/right/up/down), but the physical transition between the different locations is done through the forward looking direction (i.e., the person looks forward and moves forward). This serves as a motivation in some embodiments of the present invention to use a forward orientation sampling prior. When frames are sampled for fast forward, it is preferred to use frames looking to the direction in which the camera is translating.

Figure 2:
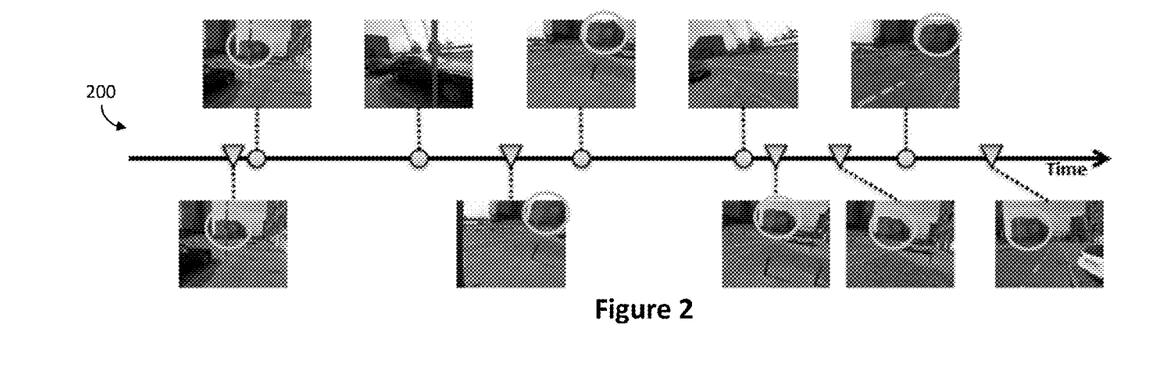
FIG. 2 is a timeline diagram illustrating an aspect in accordance with some embodiments of the present invention.

FIG. 2 is a timeline diagram illustrating an aspect in accordance with some embodiments of the present invention. Timeline diagram 200 illustrates frames from the fast forward results in accordance with some embodiments of the present invention. The camera wearer rides a bike and prepares to cross the road. Top row: uniform sampling of the input sequence leads to a very shaky output as the camera wearer turns his head sharply to the left and right before crossing the road. Bottom row: some embodiments of the present invention prefer forward looking frames and therefore samples the frames non-uniformly so as to remove the sharp head motions. The stabilization can be visually compared by focusing on the change in position of the building (circled) appearing in the scene. The building does not even show up in two frames of the uniform sampling approach, indicating the extreme shake. Note that the fast forward sequence produced by some embodiments of the present invention are post-processed by traditional video stabilization techniques to further improve the stabilization.

Computation of Motion Direction (Epipole)

Given N video frames, it would be desirable to find the motion direction (Epipolar point) between all pairs of frames, $I_t$ and $I_{t+k}$ where $k \in [1, \tau]$ and $\tau$ is the maximum allowed frame skip. When the camera is translating, the displacement direction between $I_t$ and $I_{t+k}$ can be estimated from the fundamental matrix $F_{t, t+k}$. Frame sampling will be biased towards selecting forward looking frames, frames where the epipole is closest to the center of the image.

Estimation of Motion Direction (FOE)

The inventors have found that the fundamental matrix computation can fail frequently when k (temporal separation between the frame pair) grows larger. Whenever the fundamental matrix computation breaks, we estimate the direction of motion from the FOE of the optical flow. The FOE is not computed from the instantaneous flow, but from integrated optical flow and computed as follows: (i) the sparse optical flow between all consecutive frames is computed from frame t to frame t+k. Let the optical flow between frames t and t+1 be denoted by $g_t(x,y)$. (ii) For each flow location (x,y), all optical flow vectors are averaged at that location from all consecutive frames.

$$G(x, y) = \frac{1}{k} \sum_{i=t}^{t+k-1} g_i(x, y)$$

The FOE is computed from G and is used as an estimate of the direction of motion.

The temporal average of optical flow gives a more accurate FOE since the direction of translation is relatively constant, but the head rotation goes to all directions, back and forth. Averaging the optical flow will tend to cancel the rotational components, and leave the translational components. In this case, the FOE is a good estimate for the direction of motion.

Figure 3:
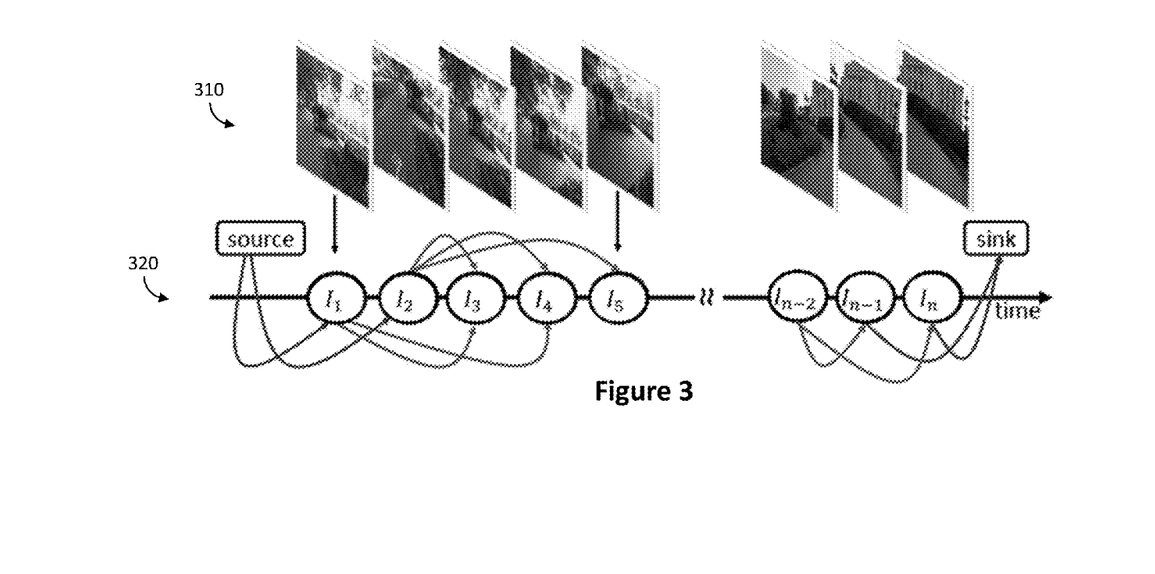
FIG. 3 is a graph diagram illustrating an aspect in accordance with some embodiments of the present invention.

FIG. 3 is a graph diagram illustrating an aspect in accordance with some embodiments of the present invention. Graph 320 illustrates how the joint fast forward and video stabilization problem is formulated as finding a shortest path in a graph. There is a node corresponding to each frame of frames 310. The edges between a pair of frames (i,j) indicate the penalty for including a frame j immediately after frame i in the output (please refer to the text for details on the edge weights). The edges between source/sink and the graph nodes allow to skip frames from start and end. The frames corresponding to nodes along the shortest path from source to sink are included in the output video.

Problem Formulation and Inference

Some embodiments of the present invention model the joint fast forward and stabilization of egocentric video as an energy minimization problem. The input video is represented as a graph with a node corresponding to every frame in the video. There are weighted edges between every pair of graph nodes, i and j, with weight proportional to our preference for including frame j right after i in the output video. There are three components in this weight:
1. Shakiness Cost ($S_{i,j}$): This term prefers forward looking frames. The cost is proportional to the distance of the computed motion direction (Epipole or FOE) from the center of the image.
2. Velocity Cost ($V_{i,j}$): This term controls the playback speed of the output video. The desired speed is given by the desired magnitude of the optical flow, $K_{flow}$, between two consecutive output frames. This optical flow is estimated as follows: (i) the sparse optical flow between all consecutive frames from frame i to frame j is computed. Let the optical flow between frames t and t+1 be $g_t(x,y)$. (ii) For each flow location (x,y), all optical flow vectors are summed at that location from all consecutive frames. $G(x,y) = \sum_{i=t}^{j-1} g_i(x,y) \; g_t(x,y)$. (iii) The flow between frames i and j is then estimated as the average magnitude of all the flow vectors G(x,y). The closer the magnitude is to $K_{flow}$, the lower is the velocity cost.

The velocity term samples more densely periods with fast camera motion compared to periods with slower motion, e.g., it will prefer to skip stationary periods, such as when waiting at a red light. The term additionally brings in the benefit of content aware fast forwarding. When the background is close to the wearer, the scene changes faster compared to when the background is far away. The velocity term reduces the playback speed when the background is close and increases it when the background is far away.

3. Appearance Cost ($C_{i,j}$): The term measures the similarity in appearance of the two frames. There are many approaches to measure appearance similarity between frames. This can be, for example, the Earth Movers Distance (EMD) between the color histograms of frames i and j. The role of this term is to prevent large visual changes between frames. A quick rotation of the head or dominant moving objects in the scene can confuse the FOE or epipole computation. The terms acts as an anchor in such cases, preventing the algorithm from skipping a large number of frames.

The overall weight of the edge between nodes (frames) i and j is given by:

$$W_{i,j} = \alpha S_{i,j} + \beta_+ V_{i,j} + \gamma_+ C_{i,j},$$

where $\alpha$, $\beta$ and $\gamma$ represent the relative importance of various costs in the overall edge weight. With the problem formulated as above, sampling frames for stable fast forward is done by finding a shortest path in the graph. We add two auxiliary nodes, a source and a sink in the graph to allow skipping some frames from start or end. We add zero weight edges from start node to first $D_{start}$ frames and from last $D_{end}$ nodes to sink, to allow such skip. We then use Dijkstra's algorithm to compute the shortest path between source and sink. The algorithm does the optimal inference in time polynomial in the number of nodes (frames).

It is noted that there are content aware fast forward and other general video summarization techniques which also measure importance of a particular frame being included in the output video, e.g., based upon visible faces or other objects. In some embodiments of the present invention, no bias is used for choosing a particular frame in the output video based upon such a relevance measure. However, the same could have been included easily. For example, if the penalty of including a frame, i, in the output video is $\delta_i$, the weights of all the incoming (or outgoing, but not both) edges to node i may be increased by $\delta_i$.

Second Order Smoothness

The formulation described in the previous section prefers to select forward looking frames, where the epipole is closest to the center of the image. With the proposed formulation, it may so happen that the epipoles of the selected frames are close to the image center but on the opposite sides, leading to a jitter in the output video. Therefore, an additional cost element is introduced: stability of the location of the epipole. It is preferred to sample frames with minimal variation of the epipole location.

Figure 4:
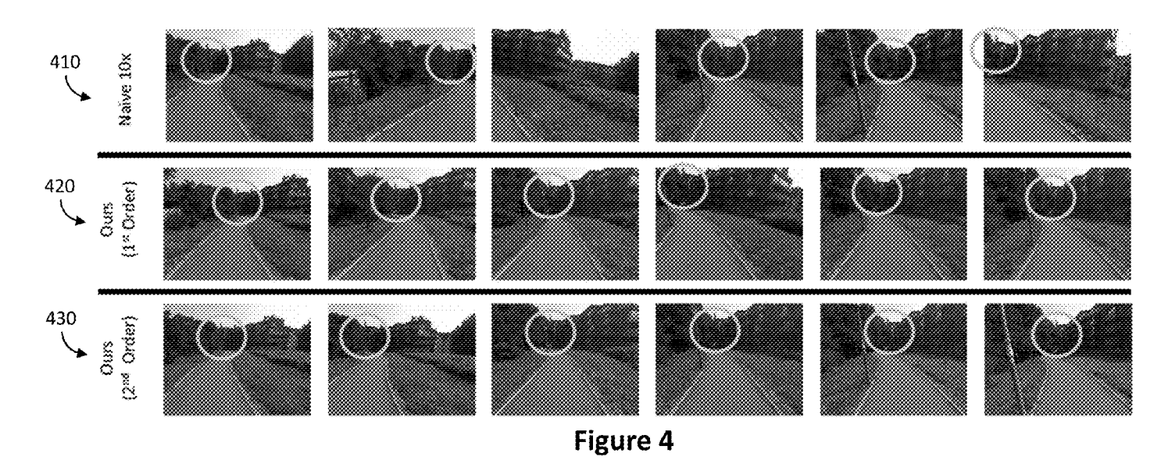
FIG. 4 is a timeline diagram illustrating an aspect in accordance with some embodiments of the present invention.

FIG. 4 is a timeline diagram illustrating an aspect in accordance with some embodiments of the present invention. Sequences 410-430 show comparative results for fast forward from Naïve uniform sampling 410, some embodiments of the present invention using first order formulation 420, and using second order formulation 430 also in accordance with embodiments of the present invention. The stability in the sampled frames as seen from the tower visible far away (circled) is noted. The first order formulation leads to a more stable fast forward output compared to Naïve uniform sampling. The second order formulation produces even better results in terms of visual stability.

Figure 5:
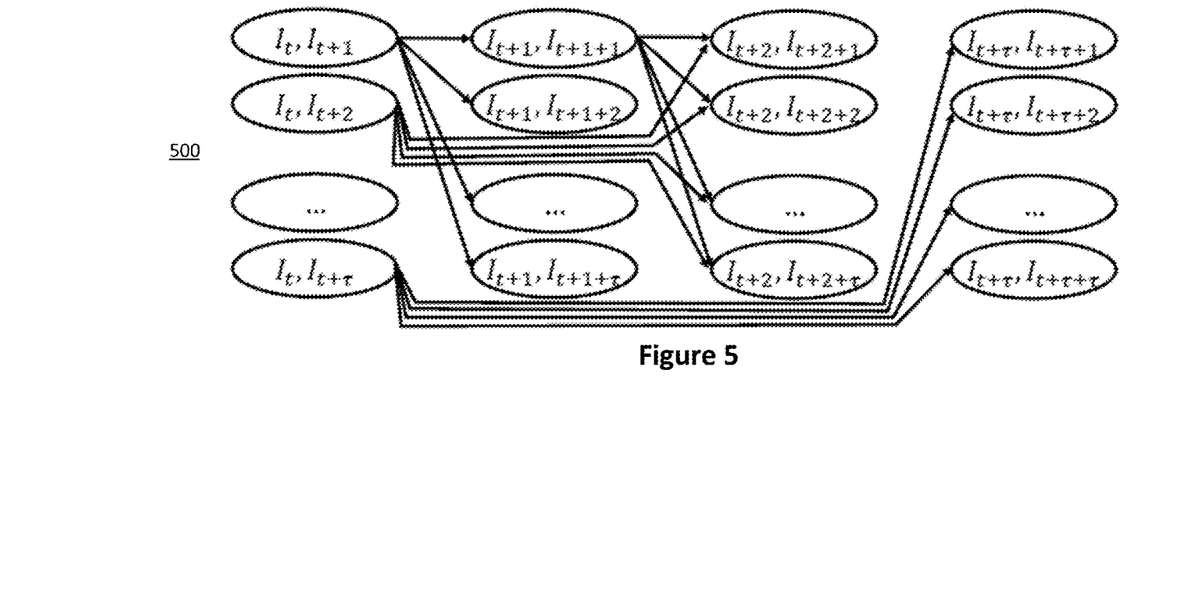
FIG. 5 is a graph diagram illustrating an aspect in accordance with some embodiments of the present invention.

To compute this cost, nodes now represent two frames, as can be seen in FIG. 5. The weights on the edges depend on the change in epipole location between one image pair to the successive image pair. Consider three $I_{t1}$, $I_{t2}$, and $I_{t3}$. Assume the epipole between Ii and $I_j$ is at pixel ($x_{ij}$, $y_{ij}$) The second order cost of the triplet (graph edge) ($I_{t1}$, $I_{t2}$, $I_{t3}$) is proportional to $\|(x_{23}-x_{12}, y_{23}-y_{12})\|$. This is the difference between the epipole location computed from frames $I_{t1}$ and $I_{t2}$ and the epipole location computed from frames $I_{t2}$ and $I_{t3}$.

This second order cost is added to the previously computed shakiness cost, which is proportional to the distance from the origin $\|(x_{23}, y_{23})\|$. The graph with the second order smoothness term has all edge weights non-negative and the running-time to find optimal solution to shortest path is linear in the number of nodes and edges, i.e. $O(n\tau^2)$. In practice, with $\tau=100$, the optimal path was found in all examples in less than 30 seconds.

The second order smoothness term is based on triplets of output frames. Now the nodes correspond to pair of frames, instead of single frame in first order formulation described earlier. There are edges between frame pairs (i; j) and (k; l), if j=k. The edge reflects the penalty for including frame triplet (i; k; l) in the output. Edges from source and sink to graph nodes (not shown in the figure) are added in the same way as in first order formulation to allow skipping frames from start and end.

As noted for the first order formulation, an importance measure for a particular frame being added in the output is not used. To add such, say for frame i, the weights of all incoming (or outgoing but not both) edges to all nodes (i,j) may be increased by $\delta_i$ where $\delta_i$ is the penalty for including frame i in the output video.

A novel frame sampling technique is proposed herein to produce stable fast forward egocentric videos. Instead of the demanding task of 3D reconstruction and rendering used by the best existing methods, a simple computation of the epipole or the FOE is relied upon. The proposed framework is very efficient, which makes it practical for long egocentric videos. Because of its reliance on simple optical flow, the method can potentially handle difficult egocentric videos, where methods requiring 3D reconstruction may not be reliable.

Figure 6:
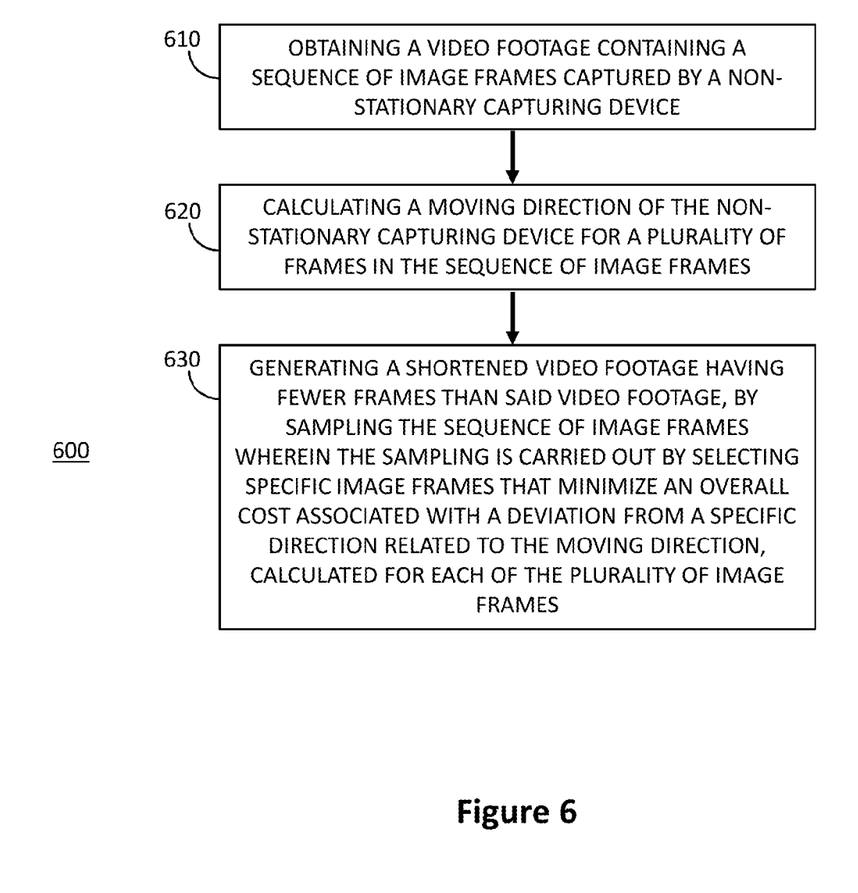
FIG. 6 is a high level flowchart illustrating non-limiting exemplary method in accordance with some embodiments of the present invention.

FIG. 6 is a high level flowchart illustrating non-limiting exemplary method 600 in accordance with some embodiments of the present invention. Method 600 may include: obtaining a video footage containing a sequence of image frames captured by a non-stationary capturing device 610; estimating a moving direction of the non-stationary capturing device for a plurality of frames in the sequence of image frames 620; and generating a shortened video footage having fewer frames than said video footage, by sampling the sequence of image frames 630. The sampling in accordance with some embodiments of the present invention is carried out by selecting specific image frames that minimize an overall cost associated with a deviation from a specific direction related to the moving direction, calculated for each of the plurality of image frames.

According to some embodiments of the present invention, the specific direction may include a predefined direction.

According to some embodiments of the present invention a specific direction comprises the direction of motion of said capturing device.

According to some embodiments of the present invention, the specific direction may include a direction determined based on analyzing said plurality of frames.

According to some embodiments of the present invention, the calculating of the moving direction of the non-stationary capturing device for each of said plurality of frames is based on optical flow calculation.

According to some embodiments of the present invention, the calculating of the moving direction of the non-stationary capturing device for each of said plurality of frames is based on homography estimation.

According to some embodiments of the present invention, the non-stationary capturing device is mounted on a person.

According to some embodiments of the present invention, the sampling may be carried out by: modeling the video footage into a graph wherein the image frames are nodes and the transitions between the image frames are edges; assigning weights indicative as the costs to the edges; solving the shortest path of the graph; and selecting the nodes of the shortest path as the selected specific image frames.

According to some embodiments of the present invention, the selecting of specific image frames that minimize an overall cost associated with a deviation from the specific direction may be carried out based on dynamic programming.

According to some embodiments of the present invention, some of the image frames used for building the mosaic are taken from other video sequences, such that a selected frame from another video was captured at an approximately same location as the first selected frame.

According to some embodiments of the present invention, the cost minimization may be applied to a cost computed on the sequence of mosaics related to the selected specific image frames.

According to some embodiments of the present invention, the weights include at least one cost associated with the generated shortened footage selected from: shakiness cost, velocity cost, and appearance cost.

According to some embodiments of the present invention, the shakiness cost may be calculated based on a deviation from the computed motion direction from the center of the image frame.

According to some embodiments of the present invention, the velocity cost may be calculated based on average optical flow, wherein higher velocity is applied for lower optical flow.

Generalizations

It is understood that some embodiments of the present invention may have further features, and it is also clear that the specific steps taken in the aforementioned embodiments can be replaced by other steps. This includes, but is not limited to, the following:

Viewing Direction Preference

Although some embodiments of the present invention indicate a preference for forward looking frames, or almost forward looking frames, a selection of frames having a consistent viewing direction, even if not a forward direction, will yield a pleasant and stable fast forward video.

Viewing Direction Estimation

A combination of 2D motion cues (e.g. optical flow, FOE and/or epipole) have been used herein, along with intensity based measures (color histograms), to characterize the viewing direction and similarity of frames. The machinery for the viewing direction and for similarity may vary. Other 2D methods (e.g., homography estimation, etc.) or 3D methods (e.g., camera ego-motion estimation, SfM, vSLAM, etc.) can be used to estimate the viewing direction and the similarity (e.g., bag of words, bag of features, etc.). The important thing is to prefer selection of frames that gives a stable output video, and drop frames that will result in unstable output video.

Global Optimization

The optimization problem as has been formulated herein as a problem of finding a shortest path in a graph. The graph structures e suggested herein are not the only structure to achieve the desired goal. It should be noted that other global optimization methods, such as Dynamic Programming, can be used to achieve similar results.

Duration of Output Video

In some embodiments of the present invention, the problem to be solved was formulated such that the output size, i.e., the duration of the summary video (e.g., the number of its frames), is not fixed. Instead, the output duration is implicitly controlled by other means. By augmenting the graph structure either by adding auxiliary nodes, or by forcing to select a node from each batch of consecutive frames, it is also possible to control the duration of the output video. Another option is to use different problem formulation—instead of shortest path, it is possible to formulate the problem as graph labeling. In this formulation, each output frame is a 'site' and the label assigned to it is either the source frame number or a shift into the source sequence. The number of sites is predetermined as the number of desired frames in the output video.

Coarse-To-Fine Optimization

To improve runtime, the method in accordance with some embodiments of the present invention can be run in a coarse to fine mode by first constructing a sparse graph, i.e., a graph that doesn't allow every possible jump. It is then possible to find a shortest path and construct a new graph, but this time the graph is much denser (i.e., contains more edges/options) around the current shortest path.

Panorama-Hyperlapse

In accordance with a variant on some embodiments of the present invention, it is possible to create panoramas/image-mosaics based on sparsely selected frames, e.g., the selected frames of the previous method. The method may start by selecting candidate frames for creating a stabilized fast-forward video (e.g., by cost minimization). Following this selection, it is possible to build mosaics around the selected frames using frames from the original video that appear before or after the selected frames. In this case, each output frame is an image-mosaic.

Figure 7:
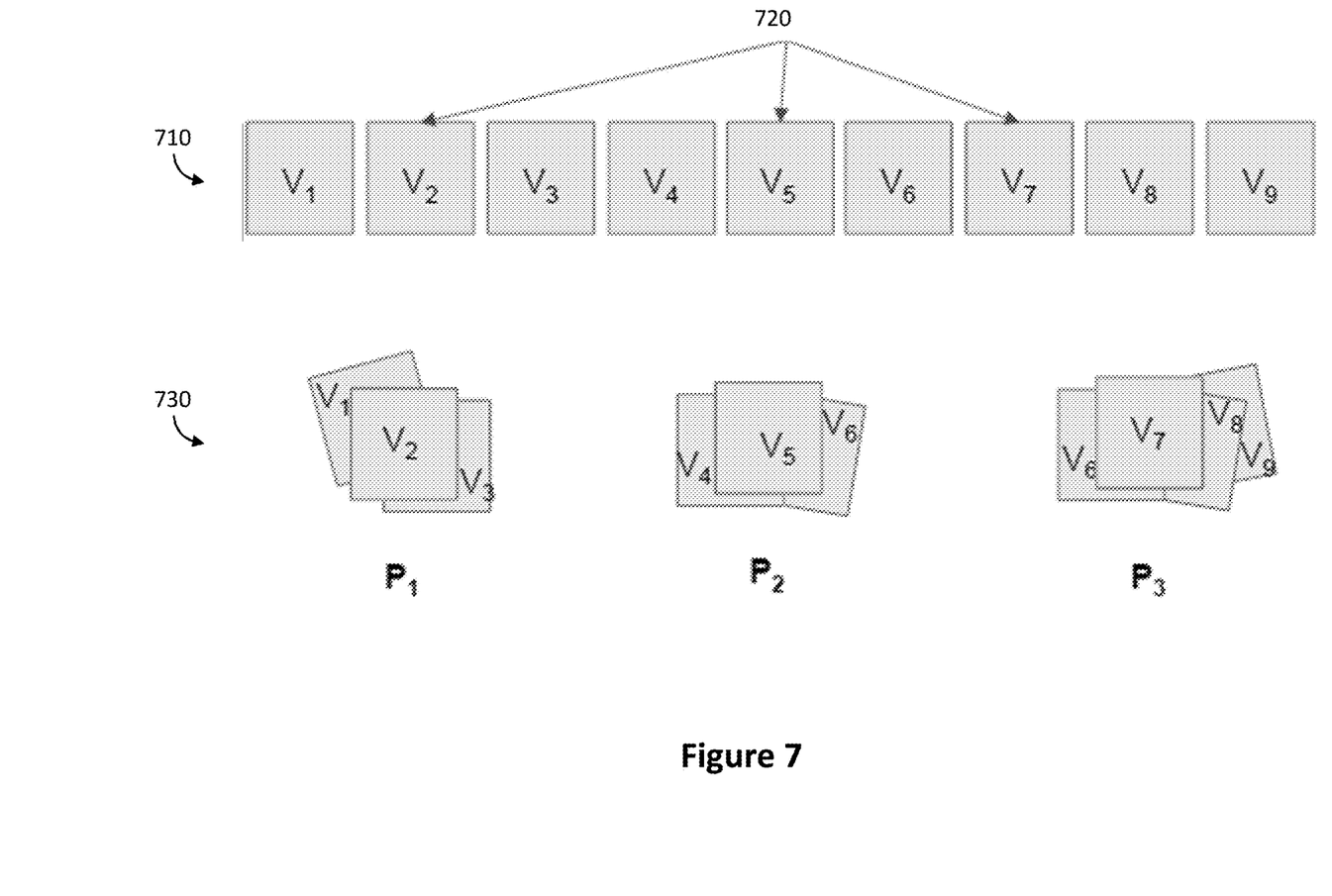
FIG. 7 shows frames diagram illustrating yet another aspect in accordance with some embodiments of the present invention.

FIG. 7 is a timeline diagram illustrating an aspect in accordance with some embodiments of the present invention. Here, panorama output video is based on central frames selection. Frames 710 are input video, from which sample a sub-sequence (v2; v5, and v7) is sampled. Frames 730 illustrate a sequence of mosaics, each mosaic constructed around one of the previously selected frames and includes a mosaic with the nearby frames aligned and warped towards the central frame. Further stabilization and cropping can be applied to the output video.

The benefits of panorama method are:

The output frames have larger field-of-view than the original frames. This helps the user to consume 'more video in less time', but this time in the spatial sense. We see information from frames that otherwise may have been discarded, since they were not aimed at the forward direction.

The large field of view contributes to the stability of output video. There are two reasons for this. One is that we perceive the output as more stable. The second reason is that it is easier to apply stabilization algorithms when there is a large overlap between the frames.

Mosaic-Oriented Hyperlapse

While previously we built mosaics around frames selected as stable, we can skip the selection of stable frames, and build a fast forward summary based on mosaics of original input frames. The simplest approach to create a panorama-hyperlapse is to select every $K^{th}$ original input frame and then construct an image-mosaic with L frames before and after each selected frame. A sequence of mosaics is achieved, each built from 2L+1 original input frames. Even though no selection based on stability has been performed, that construction of a panorama from 2L frames, coupled with the assumption that the camera vibrations are erratic and random, and eventually the camera wearer will return the view forward, create a smooth motion in the output video.

The previous paragraph assumed that K and L are fixed for the entire duration of the input video. However, we recognize that the speed of the wearer as well as the camera vibration vary along the video.

Figure 8:
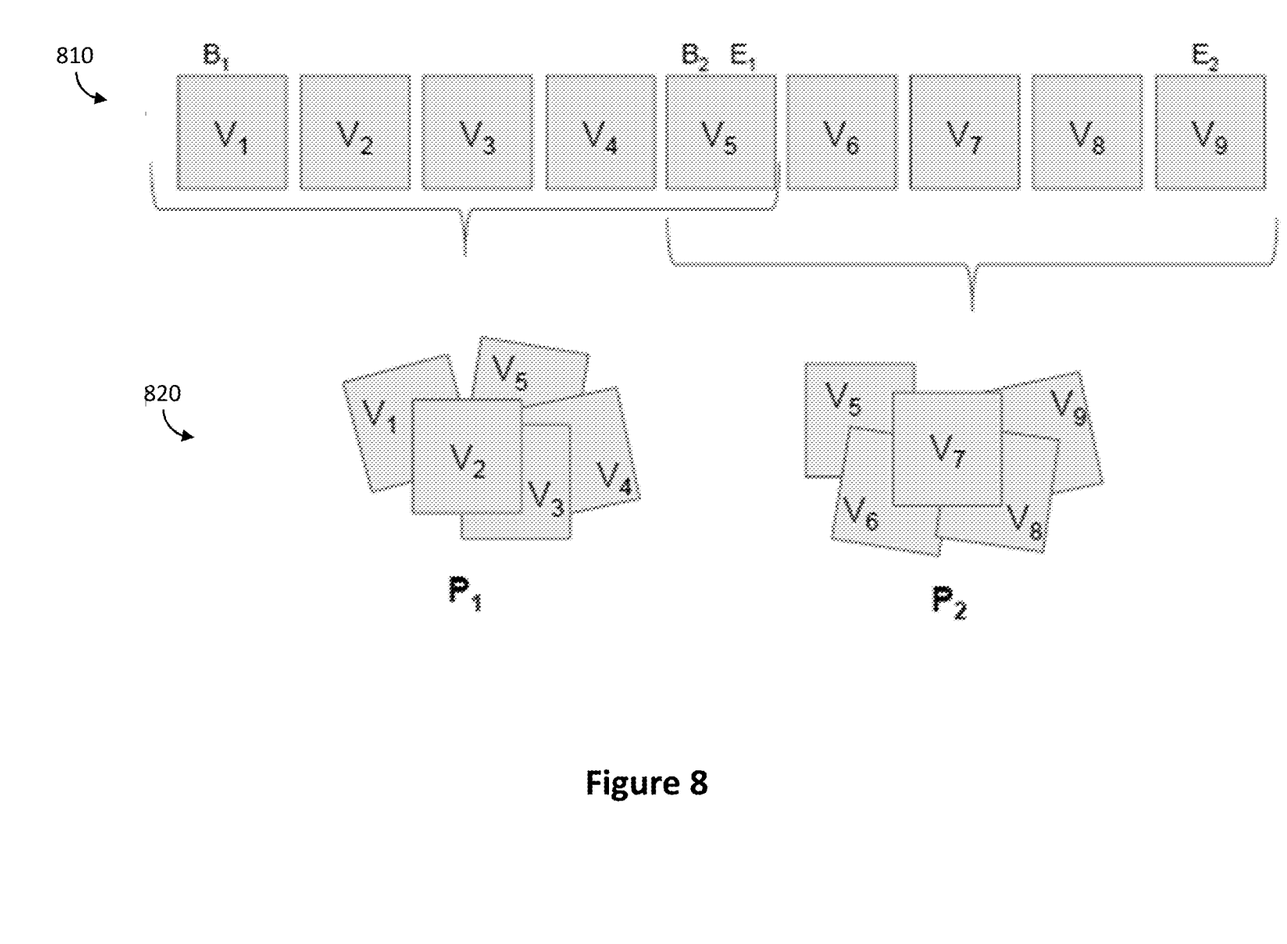
FIG. 8 shows frames diagram illustrating yet another aspect in accordance with some embodiments of the present invention.

A more general formulation of Panoramic Hyperlapse is illustrated in FIG. 8 which shows frames diagram illustrating yet another aspect in accordance with embodiments of the present invention. Building a short panoramic video from (possibly overlapping) sets of input frames. Every frame $P_i$ in the output panoramic video is constructed from a set of frames defined by its first frame Bi and its last frame $E_i$. It is possible to use in the mosaic construction only some of the frames between $B_i$ and $E_i$.

Figure 9:
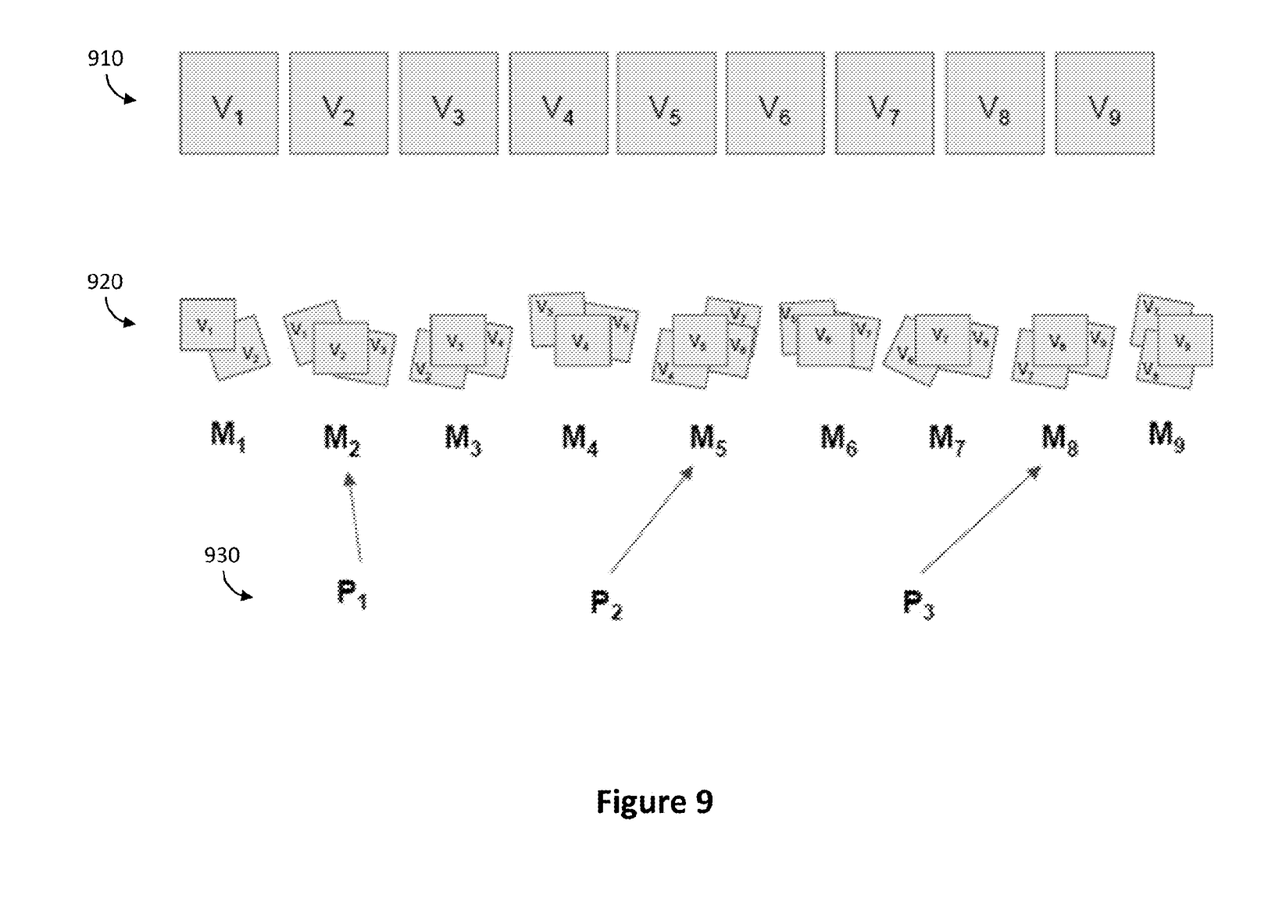
FIG. 9 shows frames diagram illustrating yet another aspect in accordance with some embodiments of the present invention.

FIG. 9 shows frames diagram illustrating yet another aspect in accordance with some embodiments of the present invention. One possibility to select the best mosaics to be included in the short panoramic video is to create many intermediate mosaics Mi, possible one mosaic image for each input frame. These mosaics can be constructed from (possibly overlapping) sets of input frames around the current frame. After the large set of mosaic images are created, a shorter sequence $P_i$ is selected to optimize the required speed and stability.

This embodiment may be described as follows:

Let $B_i$, i=1, . . . , N, be a sequence of numbers, where each $B_i$ represents the frame number of first frame in the $i^{th}$ mosaic. Normally $B_i \leq B_{i+1}$, but this is not strict.

Let $E_i$ be a sequence of numbers, $B_i \leq E_i$ where each $E_i$ represents the frame number of the last frame in the $i^{th}$ mosaic. Normally $E_i \leq E_{i+1}$, but this is not strict.

The output Panoramic Hyperlapse will consist of a sequence of panoramas $P_i$, such that each panorama $P_i$ is created from mosaicing frames between $B_i$ and $E_i$.

Note that, in some cases, it is possible that $B_i = E_i$, and the panorama $P_i$ will be created from a single input frame.

The sequences $B_i$ and $E_i$ will be selected to optimize a cost function expression of the desired stability of the output video, the desired speedup, and the desired panoramic effect each output frame should have.

An example for a cost function is:

$$C_P = \alpha \Sigma FOV_i + \beta \Sigma Stitch_i + \gamma \Sigma Stab_{i,i+1} + \delta \cdot V$$

where $FOV_i$ is the size of the field of view of the mosaic $P_{i}$, The FOV of Pi may be measured by the number of pixels in Pi that are covered by any of the input images between Bi and Ei. $Stitch_i$ is the quality of the stitching in $P_i$. Several different measurements are given for stitching quality. $Stab_{i,i+1}$ is the stability of the transition between $P_i$ and $P_{i+1}$. V is the overall velocity acceleration term. For example, if we denote the number of input frames by n, and the desired speedup by s (constant throughout the entire sequence) then this term can be $\|n/N - s\|$. Other possible velocity terms include the magnitude of the optical flow between successive panoramas or their central frames, magnitude of the motion of frame corners, and the like.

While uniform selection of panoramas will work in simple cases, it may fail when the input video is challenging. To simply solve this issue, we can sample frames from the mosaic video, to remove 'outlier frames'. It is also possible to augment our frame selection algorithm such that it'll take into account the fact that output frames serve as the base (reference) frames for mosaics. The requirements from a base frame are:

being located close to the center of the frames before and after it, so that those frames it will have large visible areas when stitched in the mosaic; and to have enough overlap with previous mosaic for stabilization.

The cost function described above addresses directly at the second, while being blind to the first. To find the center frame of a given set of frames we fit them to the same canvas and choose the frame with center closest to the mean point of all the frames' centers. We then build the mosaic around it, possibly with overlapping sets of frames. Those sets can be all frames in the video, partitioned to equally size sets, or they can vary based on the relative position of the frames. Normally each set is a continuous set of frames from the original video, but this is not strict. A frame is better added to a mosaic where it covers the most uncovered area.

Mosaic Frame Stitching

Given a set of frames, there are several ways of stitching them into a mosaic. This may include overlaying the frames one on top of the other, filling holes using motion inpainting, blending at the boundaries between frames, blending the whole overlap area, graph-cuts and the like, a moving crop window can then be applied to get rid of the areas not covered by any of the input frames.

It is possible to rectify the images for lens distortion before mosaicing. This is especially effective for wide field of view images such as those captured by Go-Pro cameras. In this case, both image alignment and image mosaicing can be performed on the rectified images. If the distortion of the camera is a desired effect, it is possible to return to the camera distortion after mosaicing.

Usually a cropping is performed after rectifying (e.g., for fish-eye correction), which loses parts of the image. When those images are stitched to a mosaic the cropping can be done only after stitching, using bigger part of the images.

Figure 10:
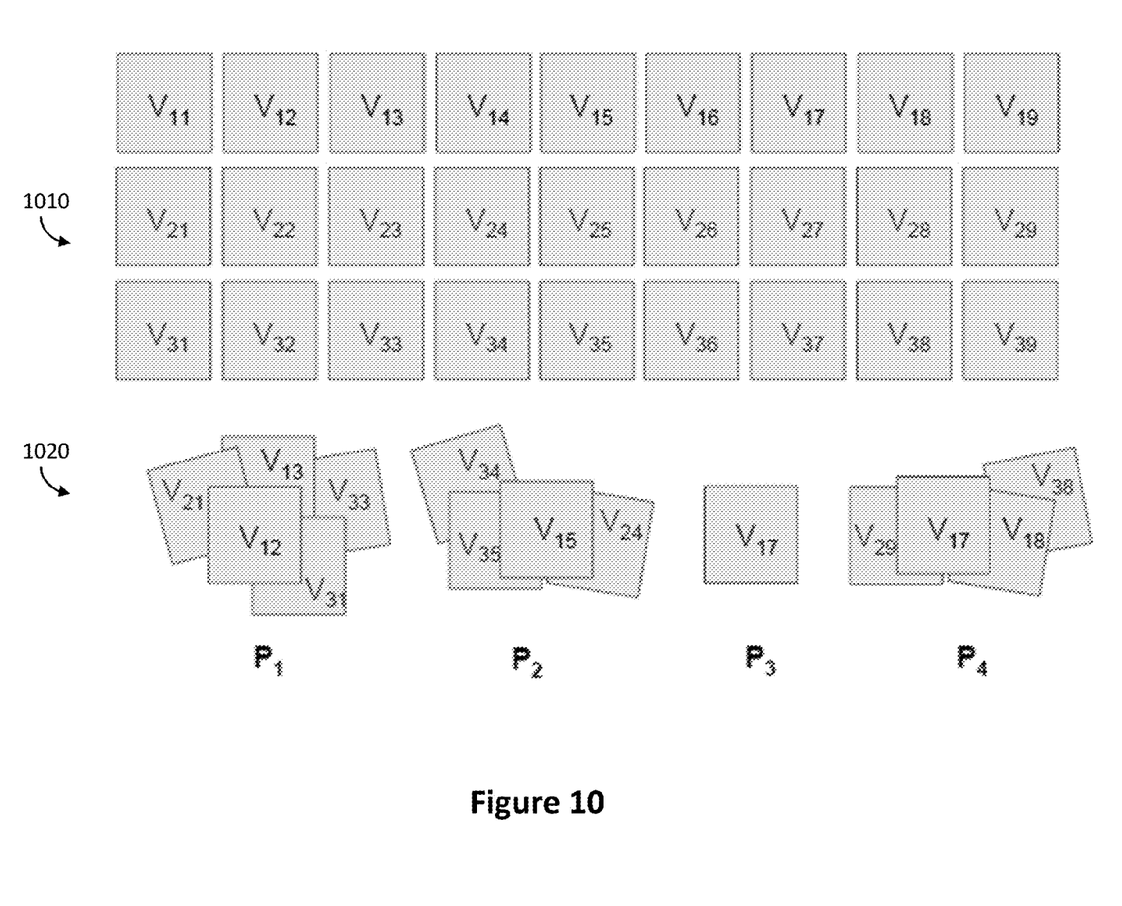
FIG. 10 shows frames diagram illustrating yet another aspect in accordance with some embodiments of the present invention.

FIG. 10 shows frames diagram illustrating yet another aspect in accordance with embodiments of the present invention. Creating a short panoramic video from multiple input videos. The first three rows indicate three input videos with frames labeled $V_{ij}$. Each frame Pi in the output panoramic video is constructed by mosaicing one or more of the input frames, which can originate from any input video. Note that the output video can also include for output frames Pi either a mosaic or also single input frame.

Figure 11:
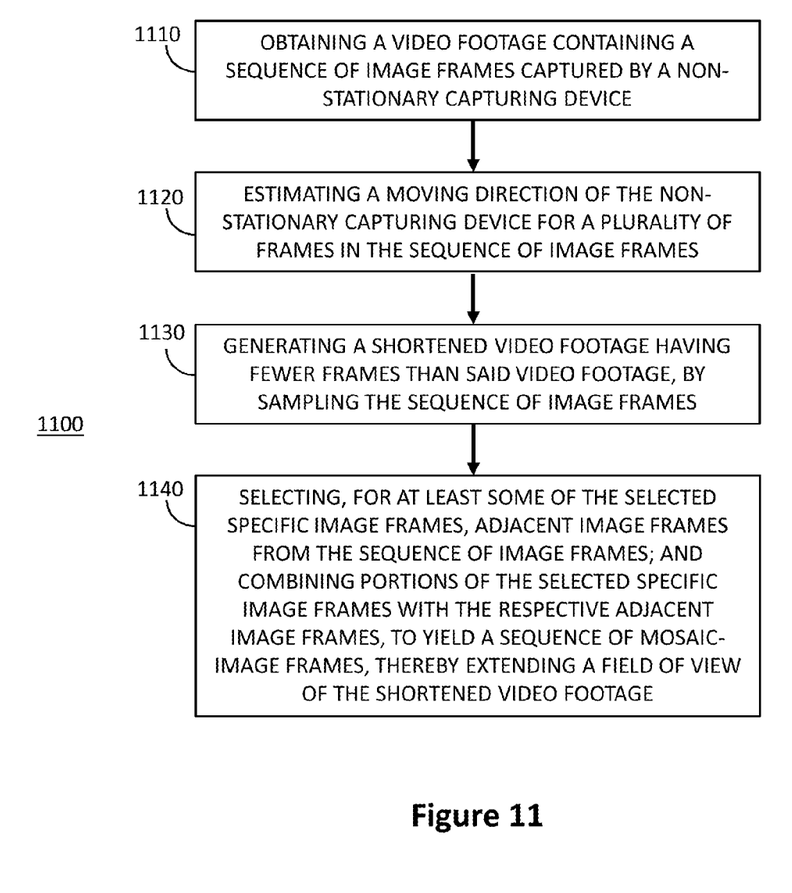
FIG. 11 is a high level flowchart illustrating non-limiting exemplary method in accordance with some embodiments of the present invention.

FIG. 11 is a high level flowchart illustrating non-limiting exemplary method 1100 in accordance with some embodiments of the present invention. Method 1100 may include: obtaining a video footage containing a sequence of image frames captured by a non-stationary capturing device 1110; estimating a moving direction of the non-stationary capturing device for a plurality of frames in the sequence of image frames 1120; and generating a shortened video footage having fewer frames than said video footage, by sampling the sequence of image frames 1130, and selecting, for at least some of the selected specific image frames, adjacent image frames from the sequence of image frames; and combining portions of the selected specific image frames with the respective adjacent image frames, to yield a sequence of mosaic-image frames, thereby extending a field of view of the shortened video footage 1140.

Multi-Video Hyperlapse

One of the limitations of frame sampling is that areas that the wearer did not look at, or gave them only a glance, will not get to the output. If we take more than one video taken by several cameras with close viewpoints, or even taken by the same camera at different times, we can create fast-forwarded video with much more flexibility. It can be dedicated to a specific task, e.g., a road the wearer drove on many times can produce a fast-forwarded video with no other vehicles on it, with each road part taken from another video source.

A mosaic can also be constructed from frames coming from several cameras. First, a frame-level temporal alignment is found between the input videos frames. Then, output frame are selected to optimize an objective (e.g. create a video in which the road we drive in is empty of cars). Lastly, panoramas are constructed to spatially extend the output frames using frames from a temporal-neighborhood from all the input videos.

Let $v_i$ be a set of video clips shot at the same location,

Let $v_{ik}$ be the $k^{th}$ frame in video clip i.

We would like to generate from all these clips a single "multi-video hyperlapse" P, where $P_t$ be the tth frame of the output hyperlapse. This is done as follows (See FIG. 13).

Choose one video to be the reference video, and align temporally the other videos to it.

Create a graph where $V_{ik}$ are the nodes in the graph, and each node can be labeled by a set $T_{ik}$ of elements from t=1, 2, . . . .

When $T_{ik}$ is empty, frame k from the $i_{th}$ video does not appear in the output video.

When $T_{ik}$ includes a single element, t, than frame k from the ith video will appear in frame $P_t$ of the output video.

When $T_{ik}$ includes multiple elements, say $t_1$ and $t_2$, than frame k from the $i_{th}$ video will appear in multiple output frames, in our example in $P_{t1}$ and in $P_{t2}$.

After the graph labeling is completed to minimize a cost function, each output frame in constructed from a set of input frames. This construction follows the mosaicing methods mentioned above.

The cost function is build such that the resulting video P is stable, and its frames are panoramic and include as much field of view as possible.

As an approximation to accelerate computation, we can assume that the set of frames from each video assigned to the same output frame is contiguous. In this case it would be possible to use a notation as used above, adapted to multiple input videos.

Another simplification is after the temporal alignment, interlace the frames to create one virtual video, and use it as an input to one of the aforementioned methods.

A possible cost function is:

$$C_M = \alpha \Sigma FOV_i + \beta \Sigma Stitch_i + \gamma \Sigma Stab_{i,i+1} + \delta \cdot Cov$$

The first three components were described above, and Cov is the quality of the cover, e.g., combination of percent of the input frames from the reference video that appear in the output, skip rate and frame importance.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, some aspects of the present invention may be embodied as a system, method or computer program product. Accordingly, some aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
    obtaining a video footage containing a sequence of image frames captured by a non-stationary capturing device;
    estimating a moving direction of the non-stationary capturing device for a plurality of frames in the sequence of image frames; and
    generating a shortened video footage having fewer frames than said video footage, by sampling the sequence of image frames,
    wherein the sampling is carried out by selecting specific image frames that reduce an overall cost associated with a deviation from a specific direction related to said moving direction, calculated for at least some of said plurality of image frames.

2. The method according to claim 1, wherein said specific direction comprises a predefined direction.

3. The method according to claim 1, wherein said specific direction comprises the direction of motion of said capturing device.

4. The method according to claim 1, wherein said specific direction comprises a direction determined based on analyzing said plurality of frames.

5. The method according to claim 1, wherein the calculating of the moving direction of the non-stationary capturing device for each of said plurality of frames is based on optical flow calculation.

6. The method according to claim 1, wherein the calculating of the moving direction of the non-stationary capturing device for each of said plurality of frames is based on homography estimation.

7. The method according to claim 6, wherein the non-stationary capturing device is mounted on a person.

8. The method according to claim 1, further comprising selecting, for at least some of the selected specific image frames, adjacent image frames from the sequence of image frames; and combining portions of the selected specific image frames with the respective adjacent image frames, to yield a sequence of mosaic-image frames, thereby extending a field of view of the shortened video footage.

9. The method according to claim 1, wherein the sampling is carried out by:
    modeling the video footage into a graph wherein the image frames are nodes and the transitions between the image frames are edges;
    assigning weights indicative as the costs to the edges;
    solving the shortest path of the graph; and
    selecting the nodes of the shortest path as the selected specific image frames.

10. The method according to claim 1, wherein said selecting specific image frames that reduce an overall cost associated with a deviation from said specific direction is carried out based on dynamic programming.

11. The method according to claim 9, wherein some of the image frames used for building the mosaic are taken from other video sequences, such that a selected frame from another video was captured at an approximately same location as the first selected frame.

12. The method according to claim 7, wherein the cost reduction is applied to a cost computed on the sequence of mosaics related to the selected specific image frames.

13. The method according to claim 9, wherein the weights comprise at least one cost associated with the generated shortened footage selected from: shakiness cost, velocity cost, and appearance cost.

14. The method according to claim 13, wherein the shakiness cost is calculated based on a deviation from the computed motion direction from the center of the image frame.

15. The method according to claim 13, wherein the velocity cost is calculated based on average optical flow, wherein higher velocity is applied for lower optical flow.

16. A system comprising:
    a memory configured to store a video footage containing a sequence of image frames captured by a non-stationary capturing device; and a computer processor configured to:
   estimate a moving direction of the non-stationary capturing device for a plurality of frames in the sequence of image frames; and
   generate a shortened video footage having fewer frames than said video footage, by sampling the sequence of image frames,
   wherein the sampling is carried out by selecting specific image frames that reduce an overall cost associated with a deviation from a specific direction related to said moving direction, calculated for at least some of said plurality of image frames.

17. The system according to claim 16, wherein said specific direction comprises one of: predefined direction, direction of motion of said capturing device, and direction determined based on analyzing said plurality of frames.

18. The system according to claim 16, wherein the calculating of the moving direction of the non-stationary capturing device for at least some of said plurality of frames is based on one of: optical flow calculation or homography estimation.

19. A non-transitory computer readable medium comprising a set of instructions that when executed cause at least one computer processor to:
   obtain a video footage containing a sequence of image frames captured by a non-stationary capturing device;
   estimate a moving direction of the non-stationary capturing device for a plurality of frames in the sequence of image frames; and
   generate a shortened video footage having fewer frames than said video footage, by sampling the sequence of image frames,
   wherein the sampling is carried out by selecting specific image frames that reduce an overall cost associated with a deviation from a specific direction related to said moving direction, calculated for at least some of said plurality of image frames.

* * * * *